United States Patent Office 2,995,607
Patented Aug. 8, 1961

2,995,607
METHOD OF PREPARING CYCLIC KETONES FROM NONCONJUGATED POLYOLEFINS
Peter P. Klemchuk, Nixon, N.J., assignor to Esso Research and Engineering Company, a corporation of Delaware
No Drawing. Filed Apr. 9, 1959, Ser. No. 805,132
9 Claims. (Cl. 260—586)

The invention relates to the synthesis of organic oxygen-containing compounds from nonconjugated polyolefin compounds. More particularly, it concerns the preparation of cyclic ketones from nonconjugated polyolefins, especially diolefins.

It was known heretofore that organic carboxylic acids could be obtained by the reaction of monoolefins, carbon monoxide and steam in the presence of certain cobalt-containing catalysts. However, no suitable process has been developed for the preparation of ketones, particularly cyclic ketones which are highly useful as solvents, e.g. for nitrocellulose, as well as being starting materials in the preparation of polymers and esters.

The principal object of this invention is to provide a process for the synthesis of cyclic ketones from nonconjugated diolefins. In accordance with the present invention, a nonconjugated polyolefin is reacted with carbon monoxide in the presence of a metal-containing catalyst, the metal of which is selected from group VIII of the periodic chart of elements on pages 56–57 of "Lange's Handbook of Chemistry," 8th edition, to form a cyclic ketone. While the presence of water in the reaction mixture is not essential, it is generally advisable to employ a substantial amount of water in order to promote the reaction and increase the yield of cyclic ketone. Furthermore, the reaction should be carried out in the substantial absence of hydrogen although small amounts of this gas, e.g. up to 300 p.s.i.a., may be present in the reaction zone without having a deleterious effect on the reaction or the product thereof. However, it is preferred to carry out the reaction in the absence of hydrogen in order to insure a good yield of cyclic ketone.

The nonconjugated polyolefin employed in the process may contain from 5 to about 30 carbon atoms. The nonconjugated acyclic polyolefins are preferably diolefins having double bonds located in the alpha and omega positions. The following formula encompasses most of the nonconjugated acyclic diolefins coming within the purview of the invention:

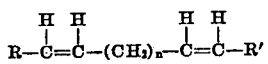

wherein $n$ is 1 to 20, preferably 1 to 5, and R and R', which may be the same or different, are hydrogen, $C_1$ to $C_{10}$ alkyl or $C_8$ to $C_{10}$ aralkyl. Among the nonconjugated acyclic polyolefins suitable for the purposes of the present invention are pentadiene-1,4, hexadiene-1,5, heptadiene-1,6, octadiene-1,7, hexadiene-1,4, heptadiene-1,4, heptadiene-1,5 and 2,11-diphenyldodecadiene-4,8.

In carrying out the invention one mole of a nonconjugated polyolefin, e.g. hexadiene-1,5, is introduced into the reaction zone where it is admixed with 1 to 4 moles of water and contacted with carbon monoxide under a pressure of 1000 to 5000 p.s.i.a. in the presence of 0.5 to 10 moles percent cobalt carbonyl (based on the olefin). The temperature is brought to between 100 and 200° C., preferably between 140 and 180° C., and the reaction is permitted to take place over a period of from a few minutes to 24 hours or more. At the higher carbon monoxide pressures, e.g. more than 1500 p.s.i.a., and higher temperatures, the reaction will be complete in about 5 minutes to 10 hours. While it is not necessary, it is generally advisable to have a substantial quantity of diluent, especially an oxygenated compound, in the reaction zone to maintain the olefin and the water, when used, in solution. The diluent may be any ketone, ether or hydrocarbon which will benefit the reaction. Among the suitable solvents available are acetone, dioxane, tetrahydrofuran, diethyl ether and heptane. Of the foregoing, acetone is preferred. The amount of diluent or solvent employed may range from 100 wt. percent to 1000 wt. percent based on the olefin, although it is generally advisable to use about 400 to 800 wt. percent of diluent in most reactions.

Catalysts which may be employed include both oil soluble and water soluble salts of nickel, iron and especially cobalt, e.g. cobalt oleate, cobalt naphthenate, cobalt stearate, cobalt acetate, cobalt carbonyl, etc. In certain instances it is possible to employ insoluble forms of cobalt, such as reduced metal cobalt oxide. However, the preferred catalyst is cobalt carbonyl.

The cyclic ketone product, which may have one or more rings containing a ketone function, is easily separated from the reaction mixture by distillation. The ketone generally being the heaviest fraction in the mixture will usually be the last material recovered from the fractionator. The distillation also serves to deactivate the catalyst and allow its removal from the mixture by filtration.

The product, which is generally a monocyclic or bicyclic ketone may be used as a solvent, converted to the corresponding lactam which may be polymerized to a polyamide, or it may be hydrogenated to form an alcohol. If the ketone contains residual unsaturation it may be polymerized to form high molecular weight products which are highly useful in the coating field.

The following examples will serve to illustrate the objects and advantages of the present invention.

Example 1

A 3000 ml. reactor was charged with 635 ml. of acetone, 135 ml. of water, 150 ml. (1.25 mole) of hexadiene-1,5 and 25 grams of cobalt carbonyl. The reactor was pressured with 1600 p.s.i.a. of carbon monoxide and the mixture was heated to 165° C. After 5 hours at that temperature, the pressure dropped 330 p.s.i.a. showing that 1.26 moles of carbon monoxide was absorbed. The solvent was distilled from the reaction product and the residue dissolved in ether and extracted with dilute sodium hydroxide to remove any acids which may be present. The ethereal solution of neutral product was then distilled and it was found that the distillate contained yields of 35% of 2,5-dimethylcyclopentanone and 6% of 2,5-dimethylcyclopent-2-eneone. It was noted that the cyclopentanone recovered had a boiling point of 146° C. under 760 mm. of mercury absolute pressure which is almost identical with the boiling point of this compound reported in the literature (147–149° C.) A portion of the 2,5-dimethylcyclopentanone recovered was reactivated with 2,4-dinitrophenyl hydrazine. It was noted that the hydrazone product formed had an orange color and melted within a few degrees of the melting point reported in the literature for this compound.

Example 2

Example 1 is repeated except 1.25 mole of pentadiene-1,4 is used as the nonconjugated olefin. The reaction mixture contains 2-methylcyclopentanone.

Example 3

Example 1 is repeated except 1.25 mole of heptadiene-1,6 is used as the nonconjugated olefin. The reaction mixture contains 2-methyl, 5-ethylcyclopentanone.

Resort may be had to various modifications and variations of the present invention without departing from

What is claimed is:

1. A process for making a cyclic ketone which comprises contacting a nonconjugated $C_5$ to $C_{20}$ acyclic diolefin with water and carbon monoxide at temperatures of 100 to 200° C. and pressures of 1000 to 5000 p.s.i.a. in the presence of a metal-containing catalyst selected from the group consisting of cobalt, iron and nickel.

2. A process for making a cyclic ketone which comprises contacting a nonconjugated $C_5$ to $C_{20}$ acyclic diolediolefin with carbon monoxide and water at a temperature of 100 to 200° C. and under a pressure of 1000 to 5000 p.s.i.a. in the presence of a cobalt-containing catalyst.

3. A process for making a cyclic ketone which comprises contacting one mole of nonconjugated $C_5$ to $C_{20}$ acyclic diolefin with carbon monoxide and 1 to 4 moles of water at a temperature of 100 to 200° C. and under a pressure of 1000 to 5000 p.s.i.a. in the presence of 0.5 to 10 mole percent of cobalt-containing catalyst based on said diolefin for at least a few minutes and recovering the cyclic ketone formed.

4. A process for making a cyclopentanone compound which comprises contacting 1 mole of a nonconjugated $C_5$ to $C_8$ acyclic diolefin with carbon monoxide and 1 to 4 moles of water at a temperature of 140 to 180° C. and under a pressure of 1000 to 5000 p.s.i.a. in the presence of 0.5 to 10 mol percent of a cobalt-containing catalyst and 100 to 1000 wt. percent of an organic diluent based on the olefin, maintaining said temperature for 5 minutes to 10 hours and recovering the cyclopentanone compound formed.

5. A process according to claim 4 in which the diluent is a compound selected from the group consisting of ketones, ether and hydrocarbon.

6. A process according to claim 4 in which the nonconjugated acyclic diolefin has its double bonds in the alpha and omega positions.

7. A process according to claim 4 in which the catalyst is cobalt carbonyl.

8. A process according to claim 4 in which the diolefin is hexadiene-1,5 and the initial pressure is not substantially above 1600 p.s.i.a.

9. A process for making cyclic pentanones which comprises contacting 1 mole of hexadiene-1,5 with about 1600 p.s.i.a. of carbon monoxide in the presence of substantial amounts of water and a cobalt carbonyl catalyst at a temperature of about 140 to 180° C., maintaining said temperature for approximately 5 hours and recovering the cyclic pentanone products formed.

References Cited in the file of this patent

UNITED STATES PATENTS

| | | |
|---|---|---|
| 2,418,850 | Raasch et al. | Apr. 15, 1947 |
| 2,448,368 | Gresham et al. | Aug. 31, 1948 |